US011663255B2

(12) United States Patent
Joko et al.

(10) Patent No.: US 11,663,255 B2
(45) Date of Patent: May 30, 2023

(54) AUTOMATIC COLLABORATION BETWEEN DISTINCT RESPONSIVE DEVICES

(71) Applicant: International Business Machines Corporation, Armonk, NY (US)

(72) Inventors: Masao Joko, Tokyo (JP); Atsushi Yamada, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 515 days.

(21) Appl. No.: 16/420,324

(22) Filed: May 23, 2019

(65) Prior Publication Data

US 2020/0372055 A1 Nov. 26, 2020

(51) Int. Cl.
*G06F 16/33* (2019.01)
*G06F 40/263* (2020.01)
*G06F 16/953* (2019.01)

(52) U.S. Cl.
CPC ........ *G06F 16/3344* (2019.01); *G06F 16/953* (2019.01); *G06F 40/263* (2020.01)

(58) Field of Classification Search
CPC .. G06F 16/3344; G06F 40/263; G06F 16/953; G06F 40/284; G06F 40/268; G06F 40/30; G06F 40/35
USPC .......................................................... 704/9
See application file for complete search history.

(56) References Cited

U.S. PATENT DOCUMENTS

| | | |
|---|---|---|
| 2018/0150524 A1 | 5/2018 | Anger et al. |
| 2018/0225365 A1 | 8/2018 | Altaf et al. |
| 2018/0287968 A1 | 10/2018 | Koukoumidis et al. |
| 2018/0337872 A1 | 11/2018 | Fawcett |
| 2019/0140986 A1* | 5/2019 | Anderson ............. H04L 67/104 |
| 2019/0158433 A1* | 5/2019 | Yun ......................... G06F 3/167 |
| 2020/0342850 A1* | 10/2020 | Vishnoi ................. H04L 51/214 |

FOREIGN PATENT DOCUMENTS

JP  6433614 A  12/2018

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Thierry L Pham
(74) *Attorney, Agent, or Firm* — Jared L. Montanaro

(57) ABSTRACT

A primary chatbot may receive a query from a user. The primary chatbot, using natural language processing techniques, may analyze the query. The primary chatbot may identify, from the analyzing, one or more key features of the query. The primary chatbot may push the one or more key features to one or more secondary chatbots. The primary chatbot may identify which one of the primary chatbot and the one or more secondary chatbots is to respond to the query. The primary chatbot may transmit the response to the user.

20 Claims, 8 Drawing Sheets

AUTOMATIC COLLABORATION BETWEEN DISTINCT RESPONSIVE DEVICES

BACKGROUND

The present disclosure relates generally to the field of artificial intelligence device communication, and more specifically to intercommunication collaboration between chatbots of distinct response areas.

Chatbots are artificial intelligence systems that usually interact with users via text. Chatbots are usually designed for a single enterprise (e.g., a math chatbot answering questions about math related topics, etc.) and very seldom do chatbots interact with any other chatbots that do not have some relation with the single enterprise (e.g., a math chatbot is unlikely to communicate with a meal-prep chatbot, etc.). The lack of chatbot interaction wastes learning opportunities for chatbots and creates a deterioration in reply accuracy.

SUMMARY

Embodiments of the present disclosure include a method, computer program product, and system for automatically selecting a chatbot most likely to properly respond to a user's query. A primary chatbot may receive a query from a user. The primary chatbot, using natural language processing techniques, may analyze the query. The primary chatbot may identify, from the analyzing, one or more key features of the query. The primary chatbot may push the one or more key features to one or more secondary chatbots. The primary chatbot may identify which one of the primary chatbot and the one or more secondary chatbots is to respond to the query. The primary chatbot may transmit the response to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
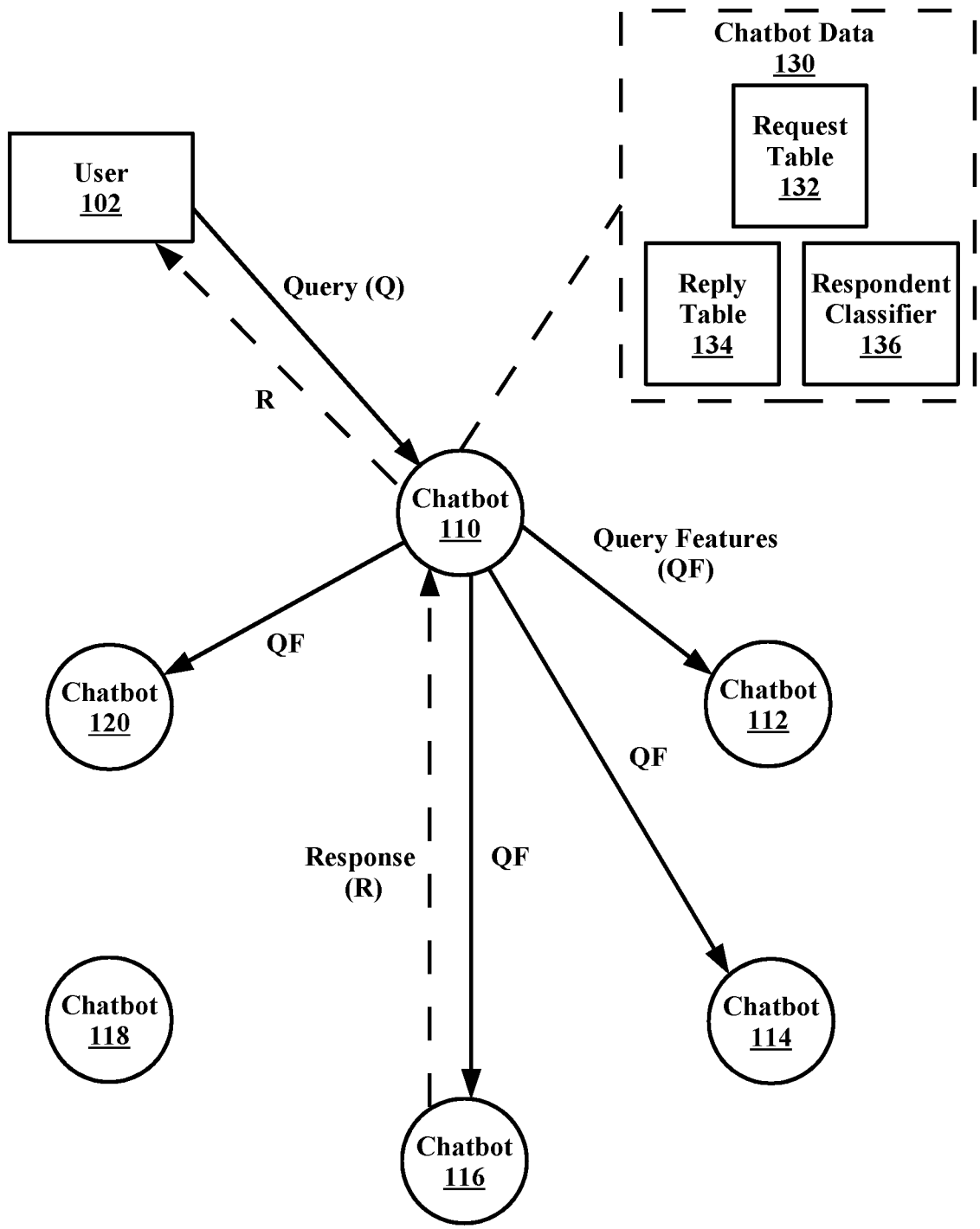
FIG. 1 illustrates an example system of chatbots communicating to determine which chatbot can most properly reply to a query, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate to the field of artificial intelligence device communication, and more specifically to intercommunication collaboration between chatbots of distinct response areas. While the present disclosure is not necessarily limited to such applications, various aspects of the disclosure may be appreciated through a discussion of various examples using this context.

Recently, the number of chatbots is growing with the development of artificial intelligence (AI) and the diversity of AI channels. Due to such channels, multiple chatbots that make similar replies are present not only among individual enterprises (e.g., businesses, helplines, etc.), but are also present within the same enterprise. This is leading to the dispersion of knowledge learned through the question and answer style learning that is used by chatbots, which in turn causes a waste of learning and deterioration in reply accuracy by each chatbot. Accordingly, there is a need for integrating chatbots with one another to help increase reply accuracy and to help users discover the answer they are looking for regardless of the chatbot they are interacting with.

In some embodiments, a primary chatbot may receive a query from a user. In some embodiments, the primary chatbot may be a processor and/or software executing on a processor. In some embodiments, the primary chatbot may be exclusive to a primary workspace (e.g., a first enterprise, trained for responding to one particular topic, etc.). The primary chatbot may analyze the query using natural language processing techniques (which are to be discussed further in regard to FIGS. 4 and 5). The primary chatbot may identify, from the analyzing, one or more key features of the query. The primary chatbot may push the one or more key features to one or more secondary (e.g., tertiary, quaternary, etc.) chatbots. In some embodiments, each of the one or more secondary chatbots may be respectively exclusive to one of one or more secondary workspaces (e.g., a second, third, fourth, etc. enterprise, each trained for other particular/specific topics, etc.).

The primary chatbot may identify which one of the primary chatbot and the one or more secondary chatbots is to respond to the query. The primary chatbot may transmit a response to the query to the user. In some embodiments, the one or more secondary workspaces may include one or more tertiary chatbots (e.g., the secondary chatbots and the tertiary chatbots may be grouped together within the same enterprise). In some embodiments, the primary workspace and any subsequently enumerated workspaces may be the same (e.g., each of the chatbots are included in the same workspace/institution/etc.).

For example, a user may be learning how to code on a particular tutorial website that includes a website (e.g., first, primary) chatbot. The user may need coding assistance and begin interacting with the website chatbot by typing the question: "How to generate an object in Python™?" into the website chatbot's search/help bar. The website chatbot may analyze the question and determine that the main features of the question are "object" and "Python™." The website chatbot may additionally determine that they only have information on object coding with Ruby.

That website chatbot may then push the words "object" and "Python™" to a group of other (e.g., secondary, tertiary, etc.) chatbots that the website chatbot is allowed to communicate with. The other chatbots may be chatbots hosted on a same server as the website chatbot, and the other chatbots may each be designated to helping users with various other coding-related tasks. For instance, one of the other chatbots (e.g., a second chatbot) may help with onboarding software and a third chatbot may help with Python™ coding questions. The onboarding (e.g., second) chatbot and the website chatbot may determine that the third chatbot with knowledge of Python™ is the most likely chatbot to be able to respond to the query.

The website chatbot may ask the third chatbot for an answer (e.g., response) to the question. Upon receiving the response from the third chatbot, the website chatbot may transmit the answer to the user. The website chatbot may then save the location of the third chatbot in the instance where another similar "object"/"Python™" question arises, and/or the website chatbot may learn the answer to said question for future instances. In some embodiments, the third chatbot (e.g., secondary or tertiary chatbot) may replace the website chatbot (e.g., primary chatbot) as the chatbot that responds to the user. It is noted that the user was availed an answer to their question even though the website chatbot was not the appropriate chatbot to originally interact with.

In some embodiments, the primary chatbot may push, in response to identifying that a first secondary chatbot is to respond to the query, the query to the first secondary chatbot. The primary chatbot may receive the response from the first secondary chatbot.

For example, a first (e.g., primary) chatbot that is a part of a cooking website may receive a question from a user asking: "How may quarts in a gallon?" and the first chatbot may determine that it does not have the answer to the query. The first chatbot, because it received the query, may begin acting as a managing entity and ask other chatbots that it is in communication with, which chatbot can lead to an answer involving "quarts" and "gallon" (e.g., key features of the query). Each of the chatbots that the first chatbot is in communication with may be other cooking related chatbots. The first chatbot may identify that a particular chatbot (e.g., first secondary chatbot) that it is in direct communication with is sending an indication that it can likely respond to the full query. The particular chatbot may be in communication with the first chatbot because the particular chatbot was coded to interact with the first chatbot when metric-related cooking questions arose from users.

The first chatbot may then send the full query to the particular chatbot for review. The particular chatbot may then send the response to the full query back to the first chatbot. In some embodiments, the first chatbot may identify that the particular chatbot that it is in direct communication with is receiving an indication from an outside chatbot (that the first chatbot is indirectly in communication with) indicating that the outside chatbot can likely respond to the full query. The outside chatbot may be in communication with the particular chatbot because the particular chatbot was coded to interact with the outside chatbot when non-cooking related questions arose from users.

The first chatbot may then send the full query to through the particular chatbot to the outside chatbot for review. The outside chatbot may then send the response to the full query back to the first chatbot through the particular chatbot. The query may be passed through the particular chatbot because the first chatbot and the outside chatbot are not in direct communication. In some embodiments, after receiving the answer to the query from the outside chatbot, the first chatbot and the outside chatbot may generate a direct communication pathway.

In some embodiments, the key features of the query are originally sent to the particular chatbot and/or the outside chatbot in order to prevent the transmission of any more than necessary information to an outside source (e.g., another chatbot, server, device, etc.). In some embodiments, the particular chatbot can be the chatbot to have the response to the query and thus stop the pushing of the key features to the outside chatbot(s). In some embodiments, the first chatbot acting as the manager will determine that each secondary chatbot (including the particular chatbot) cannot answer the query before allowing the key features to be pushed to the outside (tertiary) chatbot(s).

In some embodiments, the primary chatbot may generate, automatically, a second query. The second query may include a prompt for user feedback. The primary chatbot may receive the user feedback. The primary chatbot may update, in response to receiving the user feedback, a respondent classifier. The respondent classifier may indicate to the primary chatbot which secondary chatbots may be predicted to respond to succeeding queries.

For example, after a user is supplied a response to their query, the primary chatbot may generate a prompt for the user. The prompt may request that the user rate their satisfaction with the response and/or the accuracy of the response. Upon interacting with the prompt, the user's response may be sent to the primary chatbot, and the primary chatbot may make an indication (e.g., tag, metadata, etc.) of a secondary (and/or tertiary) chatbot that can likely help or not help respond to subsequent queries that are related to/associated with the user's query.

That is, as another example, a user may have asked a chatbot for directions on fixing a model 2 component; however, the chatbot may have been supplied a model 3 component manual from a secondary chatbot and forwarded that manual to the user. The user may indicate to the chatbot that the manual is incorrect and the chatbot may then tag (e.g., with a respondent classifier) the secondary chatbot as having a model 3 component manual and not being able to answer model 2 component questions/queries. This will allow the primary chatbot to more accurately answer both model 2 and model 3 component questions if subsequent queries regarding the components arise.

In some embodiments, when identifying which one of the primary chatbot and the one or more secondary chatbots is to respond to the query, the primary chatbot may poll each of the primary chatbot and the one or more secondary chatbots. The polling may indicate each of the primary chatbot's and the one or more secondary chatbots' confidence in the other chatbots responding to the query. The primary chatbot may rank, based on the polled confidence, the primary chatbot and the one or more secondary chatbots.

The primary chatbot may select, of the primary chatbot and the one or more secondary chatbots, a chatbot with the highest confidence.

For example, a user may input the question: "how to tie a double Windsor knot?" into a fashion help chatbot. The fashion help chatbot however may only be trained/specialized in picking correct fabric and color combinations. The fashion help chatbot, identifying that it cannot accurately answer the question, may then send key features of the question, which were determined to be double Windsor knot, to a group of secondary chatbots that the fashion help chatbot is in direct communication with. Each of the secondary chatbots may each be other fashion help chatbots that each are trained/specialized in different fields of fashion.

Each of the secondary chatbots may then do a word matching comparison between the key features and their respective repository topics. For instance, a first secondary chatbot may identify that it knows "Windsor knot," and it may alert the other secondary chatbots and the fashion help chatbot that it has an 80% confidence in answering the question. A second secondary chatbot may identify that it knows "full Windsor knot," and it may alert the other secondary chatbots and the fashion help chatbot that it has an 70% confidence in answering the question. Lastly, a third secondary chatbot may identify that it knows "double Windsor knot," and it may alert the other secondary chatbots and the fashion help chatbot that it has an 90% confidence in answering the question. The fashion help chatbot may then select the third secondary chatbot to be pushed the full question, allowing the third secondary chatbot to respond to the question.

In some embodiments, the fashion help chatbot and the secondary chatbots vote on which chatbot they believe has the best chance of responding accurately to the query. For instance, following the example above, the third secondary chatbot may disagree that the second secondary chatbot only has a confidence of 70% because the third secondary chatbot may be a tie-related chatbot that knows that a Windsor knot is synonymous with a full Windsor knot and a double Windsor knot. Thus, the third secondary chatbot may vote that the secondary chatbot has a 90% confidence in responding to the query too. In some embodiments, if the confidence of two or more chatbots is tied (e.g., they have equal or substantially the same confidence), the primary chatbot, acting as a mediator/moderator may select the chatbot it is in more direct communication with as determined by previous interactions. It is noted that the primary chatbot (e.g., the fashion help chatbot) may display its confidence to the other secondary chatbots and may be ranked and voted on as well.

In some embodiments, when polling for each of the primary chatbot's and the one or more secondary chatbots' confidence in the other chatbots responding to the query, the primary chatbot may compare the one or more key features to metadata associated with each of the primary chatbot and the one or more secondary chatbots. The primary chatbot may identify how much of the metadata matches the one or more key features. The primary chatbot may allocate a numerical tag to each of the primary chatbot and the one or more secondary chatbots. The numerical tags may indicate the amount of metadata that matched the one or more key features.

For example, a Lewis-base reaction help chatbot may receive the query: "how to find the electron configuration of $Al^{3+}$," and the Lewis-base reaction help chatbot may identify the key features of the query as "electron configuration" and "$Al^{3+}$." The Lewis-base reaction help chatbot may send the key features to secondary chemistry-help chatbots. The Lewis-base reaction help chatbot may analyze metadata of each secondary chatbot and determine which ones can likely answer the query.

For instance, the Lewis-base reaction help chatbot may identify from metadata that a first secondary chatbot only deals with non-metal organic chemistry, and therefore there are no matches between the metadata and the query. The first secondary chatbot may then receive a numerical (metadata) tag with zero, indicating that it cannot answer the query to any degree of certainty (e.g., has a low confidence). Whereas, the Lewis-base reaction help chatbot may identify that a second secondary chatbot deals with complex ions and one of the ions is $Al^{3+}$. The Lewis-base reaction help chatbot may tag the second secondary chatbot with a numerical tag of 50, that indicates that the second secondary chatbot has a more than 50% chance of/confidence in answering the question, etc.

In some embodiments, the numerical tags may be onetime use and may only be used for the specific query trying to be answered. That is, each new query begins the tagging process over. In other embodiments, the numerical tags may be saved in a tag repository and they can be accessed again if a future query is received by a chatbot that meets a threshold level of association to an original query associated with particular numerical tagging.

In some embodiments, pushing the one or more key features to the one or more secondary chatbots is in response to the primary chatbot determining that it is incapable of answering the query. This is so that computing power and resources are not needlessly wasted in distributing key features of the query and the query itself to other chatbots if the primary chatbot is able to accurately respond to the query itself.

In some embodiments, the primary chatbot may be replaced or replace itself with one of the one or more secondary chatbots. The primary chatbot may transfer the user to one of the one or more secondary chatbots for the response to the query. For example, the primary chatbot may have determined that it does not have enough information to accurately respond to a user's query but a secondary chatbot does. Instead of having the response forwarded to the primary chatbot and having the primary chatbot transmit the response to the user, the primary chatbot may connect the user to the secondary chatbot and the secondary chatbot may respond to the user. In some embodiments, the primary chatbot may still additionally receive the accurate response from the secondary chatbot so the primary chatbot can still learn the correct/most accurate response to user's query and, in turn, other related queries.

Referring now to FIG. 1, illustrated is an example system 100 of chatbots 110, 112, 114, 116, 118, and 120 communicating to determine which chatbot can most properly reply to a query, in accordance with embodiments of the present disclosure. In some embodiments, the system 100 includes a user 102 and chatbots 110, 112, 114, 116, 118, and 120. In some embodiments, the chatbot 110 includes chatbot data 130, which includes a request table 132 that indicates which other chatbots the chatbot 110 is allowed to communicate with, a reply table 134 that the chatbot 110 would use to determine which other chatbots it would reply to if given a request by one or more of the other chatbots, and a respondent classifier 136 that indicates which chatbot is responding to the query. In some embodiments, each of the chatbots 110, 112, 114, 116, 118, and 120 includes its own respective variant of the chatbot data 130.

In some embodiments, the chatbot data 130 and/or the request table 132, the reply table 134, and the respondent classifier 136 are based off of one or more of the features listed below:

A Respondent Resolution Protocol (RRP): A protocol for acquiring a respondent (chatbot) appropriate for the reply to a certain query. Thus, the appropriate reply can be acquired without integrally handling the knowledge (reply) possessed by each and every individual chatbot. It is noted that there are many chatbots (for example, chatbots within an enterprise) that are not publicly available, and therefore there is a real-world difficulty in satisfying a condition that all chatbots should be accessible. Accordingly, with global knowledge obtained by combining local information of each chatbot, is useful in terms of practical application to incorporate chatbots with such an intercommunication protocol, e.g., the RRP.

A Secured Chat Quotation Protocol (SCQP): A protocol for enabling a certain chatbot to safely use utterances and/or communications of the other chatbots. This enables conversation with the user in a state in which a source of the utterance/communication is explicit, and therefore the knowledge of the chatbot can be safely distributed (e.g., this is a reason why key features of a query are first sent to secondary and tertiary chatbots before the full query is sent).

A Learning Respondent Resolution Algorithm using Machine Learning: Using machine learning techniques, in this case, classified as natural language processing, a classifier presenting the respondent (chatbot) appropriate for the query response is updated based on the information about a candidate chatbot presented by each chatbot and the feedback from the user with respect to the query. This enables scoring of the respondent (chatbot) appropriate for the input (query), thereby achieving more dynamic and flexible selection of the respondent compared to static routing, such as a "round robin."

In some embodiments, the chatbot 110 receives a query (Q) from the user 102. The chatbot 110 then analyzes the query for query (key) features (QF) of the query and determines (either from the query itself or the query features) that it is or that it may be incapable of accurately responding to the query. The chatbot 110 accesses the chatbot data 130 and determines from the request table 132, which other chatbots it is programmed to communicate with and can send the query features to. In some embodiments, the chatbot 110 is manually programmed by a user to communicate with user selected chatbots. In other embodiments, the chatbot 110 is updated, via machine learning, to determine from past query results on which other chatbots to communicate with.

In some embodiments, from accessing the request table 132, the chatbot 110 identifies that it is allowed to communicate with chatbots 112, 114, 116, and 120. The chatbot 110 sends the query features to each of the other chatbots 112, 114, 116, and 120. In some embodiments, each of the other chatbots 112, 114, 116, and 120 uses their own respondent classifier (and the query features) to determine which chatbot is most appropriate (e.g., with a degree of confidence) candidate to respond to the query. By using the respondent classifier(s), for example, the chatbot 116 may identify itself, chatbot 116, as the most appropriate candidate to respond to the query. However, in other embodiments, chatbot 116 may identify chatbot 120 (e.g., a chatbot in the request table 132) as the most appropriate candidate by updating its own respondent classifier (e.g., the respondent classifier of 116) to indicate chatbot 120 as the most appropriate candidate. In other embodiments, a (tertiary) chatbot not in the request table 132 and/or which may not be in direct communication with chatbot 110 may be identified by chatbot 116 from its (updated) respondent classifier as the most appropriate candidate.

Following the example above, it is noted that a request table of chatbot 116 is only used when the chatbot 116 receives the query and is used to identify which chatbot that chatbot 116 is allowed to communicate with. In another example, if the user sends a query not to chatbot 110 but instead to chatbot 116, the request table of chatbot 116 will be used to identify which chatbots the chatbot 116 should send query features to.

In some embodiments, after determining which chatbot is most appropriate to respond to the query, each of the other chatbots 112, 114, 116, and 120 replies, with their selected chatbot, to the request of chatbot 110. If the reply table of the other chatbots 112, 114, 116, and 120 does not include 110, the chatbots 112, 114, 116, and 120 do not reply to the request of 110.

For example, chatbot 120, which receives a request from chatbot 110, determines whether to reply to chatbot 110 based on the reply table of chatbot 120 (e.g., its own reply table). If chatbot 110 is on the list of the reply table of chatbot 120, chatbot 120 replies to chatbot 110. Otherwise, chatbot 120 does not reply to chatbot 110. It is noted that above example can be used in context for each of the other chatbots 112, 114, and 116 that receive a request from chatbot 110. It is further noted that based on the reply table of each of the other chatbots 112, 114, 116, and 120, that all, none, or any combination of the chatbots may reply to chatbot 110.

In some embodiments, the chatbot 110 determines the most appropriate chatbot based on the reply of the other chatbots. In some embodiments, the chatbot 110 determines which chatbot is most likely to be able to respond the query by a majority vote/poll from the candidates that the other chatbots have recommended to reply.

For example, after being sent the key features of the query, the chatbot 112 accesses its request table and identifies that it can communicate with chatbots 110, 114, 116, and 120. Chatbot 112 determines (e.g., votes), that from chatbots 110, 114, 116, and 120, that chatbots 110 and 116 are most likely to be able to answer the query. Chatbot 112 then stores its selections of chatbots 110 and 116 in its own respondent identifier. While at the same time as chatbot 112 is making its selection(s) of appropriate chatbots for responding to the query, chatbots 114, 116, and 120 are accessing their own request tables and making their own selection(s) for the best chatbot to respond to the query (and adding said selections to their own respondent classifiers).

In said example, chatbot 114 makes the selection to corroborate that chatbot 116 is the best candidate for responding to the query; chatbot 116 makes the determination to not select any chatbots it is allowed to interact with (as determined by the request table of chatbot 116) as it may not have enough interaction time, etc. with each chatbot to make a selection/determination; and chatbot 120 makes the selection that chatbots 116 and 112 are the best candidate for responding to the query.

Furthering the example, chatbot 110, acting as a mediator/moderator may receive each selection for the chatbot to respond to the query from each of the chatbots 112, 114, 116, and 120 by way of each chatbot's respective respondent classifier and/or the chatbot 110 accesses each chatbot's respective respondent classifier for the selections for the chatbot to respond to the query. In some embodiments, the chatbot 110 identifies that chatbot 116 was corroborated as the best candidate by a majority (vote) of the other chatbots and changes the respondent classifier 136 to designate chatbot 116 as the user 102's new chatbot for responding to the query. In other embodiments, the chatbot 110 identifies that chatbot 116 is the best candidate for responding to the query by using classification probabilities calculated by chatbot 110 itself with respect to the query as a weight.

For example, classification probabilities may be given by chatbot 110 based on historical interactions between chatbot 110 and each of the other chatbots it is allowed to communicate with based on the request table 136. The classification probabilities given by chatbot 110 may be chatbot 112=0.5; chatbot 114=0.3; chatbot 116=0.7; and chatbot 120=0.9. Chatbot 110 calculates the respondent information (e.g., from the respondent classifier of each chatbot) for each chatbot (e.g., chatbot 116 from chatbot 114; and chatbots 112 and 116 from chatbot 120) as weighted sums (e.g., chatbot 116's weighted sum for determining if it should respond to the query=0.3+0.9 [chatbot 114's probability plus chatbot 120's probability because chatbots 114 and 120 selected chatbot 116]=1.2; and chatbot 112's weighted sum for determining if it should respond to the query=0.9 [chatbot 120's probability because chatbots 120 selected chatbot 112]). From the weighted sum, chatbot 110 selects chatbot 116 as the chatbot that should respond to the query (e.g., the respondent). In some embodiments, chatbot 110 updates the respondent classifier 136 to indicate chatbot 116 as the respondent.

In some embodiments, after selecting chatbot 116 as the respondent, the chatbot 110 pushes/sends the query to the chatbot 116. The chatbot 116 then analyzes the query and generates a response (R) for the query. The chatbot 116 pushes/sends the response to the chatbot 110, which then transmits the response to the user 102.

In some embodiments, the chatbot 110 first looks at the respondent classifier 136 to determine if it should be the chatbot to transmit the response to the user. That is, in some embodiments, the chatbot 110 may determine that the query is too complex or large for the chatbot 110 to be used as an intermediary and may update the respondent classifier 136 to indicate that the chatbot 116 should directly deliver/transmit the response to the user 102. In some embodiments, the chatbot 110 updates the respondent classifier 136 and/or the request table 132 after choosing chatbot 116 to respond to the query so as to make a priority of the other chatbots; for example, chatbot 116 is prioritized to respond to subsequent queries that may be related to the query submitted by user 102. This allows the chatbot 110 to acquire the appropriate chatbot to respond to the query based on its knowledge (e.g., learning from previous selections of appropriate chatbots to respond to queries).

It is noted that chatbot 118 is left out of the selecting because it was not in the request table 132 of chatbot 110, which would allow chatbot 110 to communicate with chatbot 118 had it been included in the request table 132. However, in another example, the chatbot 118 is in communication with chatbot 120 based on chatbot 120's respondent classifier and may be made a selection by chatbot 120. Still though, chatbot 120 may be disregarded as a selection by chatbot 110 acting as a mediator. However, in some embodiments, chatbot 110 may allow chatbot 118 to respond to the query through chatbot 120 in some instances.

It is further noted that in some embodiments, any of the chatbots 110, 112, 114, 116, 118, and 120 may be the first chatbot input the query by the user 102. In which case, the chatbot that is first input with the query becomes the mediator/moderator for the group of chatbots and performs the functions as described above in regard to chatbot 110 (e.g., each chatbot has their own request table, reply table, and respondent classifier and is able to determine the most appropriate chatbot to respond to the query).

Figure 2:
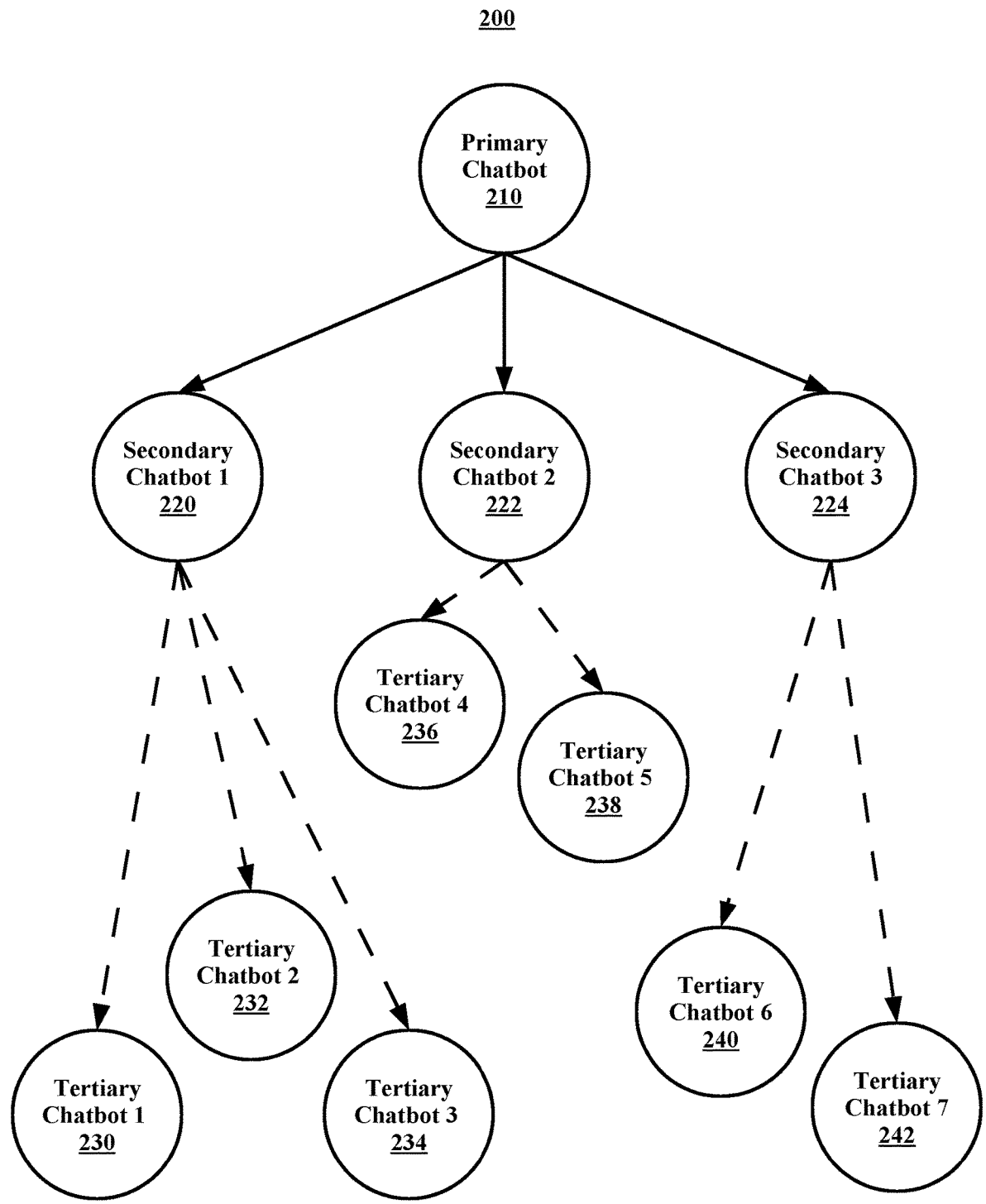
FIG. 2 illustrates an example system of a primary chatbot communicating with secondary chatbots and their related tertiary chatbots, in accordance with embodiments of the present disclosure.

Referring now to FIG. 2, illustrated is an example system 200 of a primary chatbot 210 communicating with secondary chatbots 220, 222, and 224 and their related tertiary chatbots 230, 232, 234, 236, 238, 240, and 242, in accordance with embodiments of the present disclosure. In some embodiments, the primary chatbot 210 receives a query (not shown) and using natural language processing techniques identifies key features of the query.

The primary chatbot 210 pushes/forwards/distributes the key features of the query to the first secondary chatbot 220, the second secondary chatbot 222, and the third chatbot 224 based on the primary chatbot's request table (which was described above in regard to FIG. 1). In some embodiments, the primary chatbot 210 is in direct communication with the secondary chatbots 220, 222, and 224 and not in direct communication with the tertiary chatbots 230, 232, 234, 236, 238, 240, and 242 (e.g., the primary chatbot 210 has to indirectly communicate with the tertiary chatbots 230, 232, 234, 236, 238, 240, and 242 via the secondary chatbots 220, 222, and 224, which are each able to communicate with their respective tertiary chatbots based on their own respective request tables). In other embodiments, the primary chatbot 210 acts like a managing entity and directly communicates with both the secondary chatbots 220, 222, and 224; and the tertiary chatbots 230, 232, 234, 236, 238, 240, and 242. In some embodiments, the primary chatbot 210 pushes the key features of the query to the secondary chatbots 220, 222, and 224 if the primary chatbot 210 determines that it is unable to properly/accurately respond to the query (e.g., within a degree of certainty).

In some embodiments, each of the secondary chatbots 220, 222, and 224 has its own respective respondent classifier and may find the appropriate chatbot to respond to the query based on its own knowledge without resending the query to any tertiary chatbots. In such an instance, the respondent classifier(s) output the respondent chatbot (e.g., which chatbot is most appropriate to respond to the query) and the confidence of the appropriateness for the selected chatbot to respond to the query.

In some embodiments, the first secondary chatbot 220 pushes the key features of the query to the first tertiary chatbot 230, the second tertiary chatbot 232, and the third tertiary chatbot 234. The second secondary chatbot 222 pushes the key features of the query to the fourth tertiary chatbot 236 and the fifth tertiary chatbot 238. The third secondary chatbot 224 pushes the key features of the query to the sixth tertiary chatbot 240 and the seventh tertiary chatbot 242. In some embodiments, the secondary chatbots 220, 222, and 224 push the key features of the query to the tertiary chatbots 230, 232, 234, 236, 238, 240, and 242 if the secondary chatbots 220, 222, and 224 determine they are unable to properly/accurately respond to the query (e.g., within a degree of certainty). In some embodiments, each of the tertiary chatbots 230, 232, 234, 236, 238, 240, and 242 is chosen by a user or automatically selected to cooperate with the secondary chatbots 220, 222, and 224; and the primary chatbot 210 based on one or more respective request tables.

In some embodiments, the tertiary chatbots 230, 232, 234, 236, 238, 240, and 242 each analyze the key features of the query and determine within a degree of certainty/confidence which one of the tertiary chatbots they believe can most accurately/properly respond to the query given the key features. That is, in some embodiments, each of the tertiary chatbots 230, 232, 234, 236, 238, 240, and 242 (and the secondary chatbots 220, 222, and 224) is polled as to determine/select a confidence as to which chatbot it believes is most likely to have an appropriate response to the query. In some embodiments, each of the tertiary chatbots 230, 232, 234, 236, 238, 240, and 242 records/determines/makes its selection(s) based on its own respective respondent classifier.

In some embodiments, each of the secondary chatbots 220, 222, and 224 may determine selections for the most appropriate chatbot based on each of the tertiary chatbots' 230, 232, 234, 236, 238, 240, and 242 selections and update each of their own respective respondent classifiers which are then forwarded to the primary chatbot 210 for weighting/ranking.

In some embodiments, the primary chatbot 210 ranks each of the tertiary chatbots 230, 232, 234, 236, 238, 240, and 242, based on their perceived (e.g., numerical, weighted) confidence, and identifies which chatbot is ranks first. The primary chatbot 210 then sends the query to the chosen tertiary chatbot for analysis, and the primary chatbot 210 receives a response to the query from the chosen tertiary chatbot. In some embodiments, the primary chatbot 210 sends the query and receives the response to the query via the secondary chatbot that is associated/related to the chosen tertiary chatbot.

In some embodiments, each of the chatbots or groups of the chatbots, e.g., the primary chatbot 210, the secondary chatbots 220, 222, 224, and the tertiary chatbots 230, 232, 234, 236, 238, 240, 242 are a part of separate workspaces (e.g., entity, institution, special-skills area, etc.), which allows each of the chatbots to work together to respond to a query even if the chatbot receiving the query is not in the workspace of being able to answer the query. In some embodiments, any of the chatbots presented in FIG. 2 can be supplied with a query and would, therefore, become the primary chatbot 210.

Figure 3:
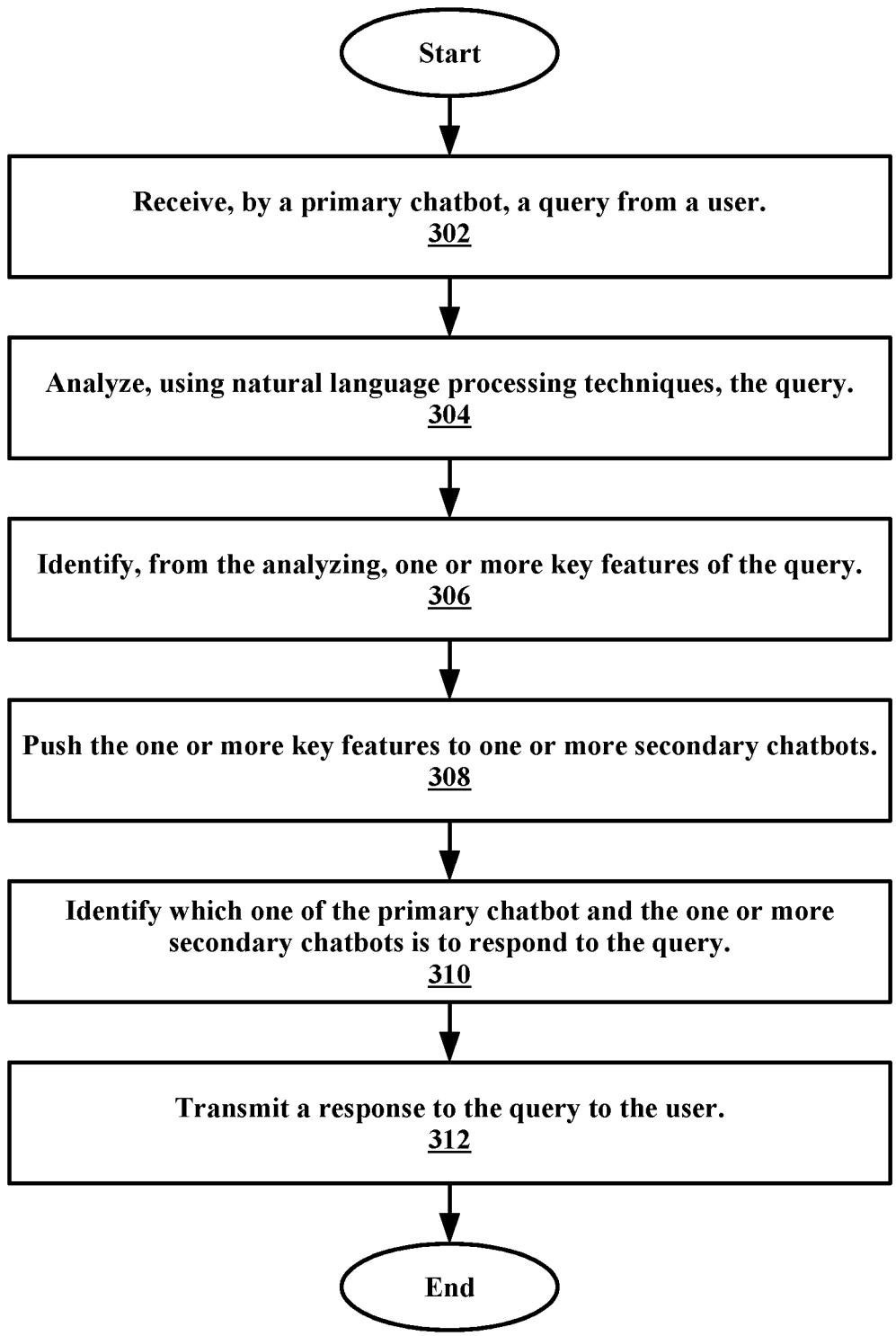
FIG. 3 illustrates a flowchart of an example method for transmitting a response to a user via a primary chatbot, in accordance with embodiments of the present disclosure.

Referring now to FIG. 3, illustrated is a flowchart of an example method 300 for transmitting a response to a user via a primary chatbot, in accordance with embodiments of the present disclosure. In some embodiments, the method 300 may be performed by a processor and/or a chatbot utilizing a processor and/or system.

In some embodiments, the method 300 begins at operation 302. At operation 302, a primary chatbot receives a query from a user. In some embodiments, the primary chatbot is exclusive to a primary workspace. In some embodiments, the method 300 proceeds to operation 304 where the query is analyzed, by the primary chatbot, using natural language processing techniques.

In some embodiments, the method 300 proceeds to operation 306. At operation 306, the primary chatbot identifies, from the analyzing, one or more key features of the query. In some embodiments, the method 300 proceeds to operation 308 where the primary chatbot pushes the one or more key features to one or more secondary chatbots. In some embodiments, each of the one or more secondary chatbots are respectively exclusive to one of one or more secondary workspaces. In some embodiments, the one or more secondary workspaces include one or more tertiary chatbots that are in direct communication with respective secondary chatbots and in indirect communication with the primary chatbot (e.g., a secondary chatbot is used as an intermediary for the primary and a tertiary chatbot to communicate).

In some embodiments, the method 300 proceeds to operation 310. At operation 310, the primary chatbot identifies which one of the primary chatbot and the one or more secondary chatbots is to respond to the query. In some embodiments, the method 300 proceeds to operation 312 where a response to the query is transmitted to the user via the primary chatbot. In some embodiments, the method 300 ends after operation 312.

Figure 4:
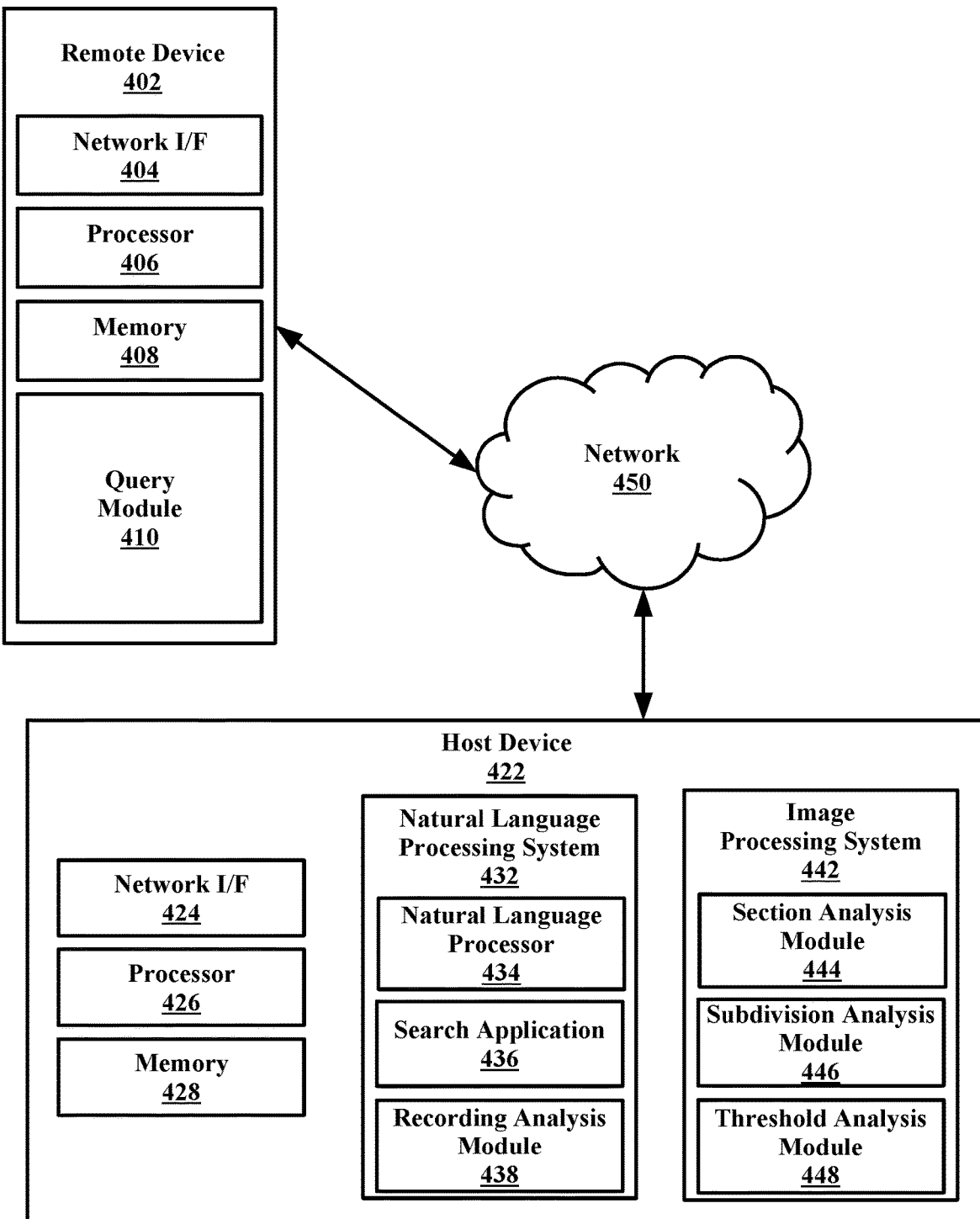
FIG. 4 illustrates a block diagram of an example computing environment in which illustrative embodiments of the present disclosure may be implemented.

As discussed above, aspects of the disclosure may relate to natural language processing. Accordingly, an understanding of the embodiments of the present invention may be aided by describing embodiments of natural language processing systems and the environments in which these systems may operate. Turning now to FIG. 4, illustrated is a block diagram of an example computing environment 400 in which illustrative embodiments of the present disclosure may be implemented. In some embodiments, the computing environment 400 may include a remote device 402 and a host device 422. In some embodiments, either the remote device 402 or the host device 422 may be chatbots. In some embodiments, both the remote device 402 and the host device 422 may be chatbots.

In some embodiments, the host device 422 and the remote device 402 may be computer systems. The remote devices 402 and the host device 422 may include one or more processors 406 and 426 and one or more memories 408 and 428, respectively. The remote device 402 and the host device 422 may be configured to communicate with each other through an internal or external network interface 404 and 424. The network interfaces 404 and 424 may be modems or network interface cards. The remote device 402 and/or the host device 422 may be equipped with a transmit or monitor. Additionally, the remote device 402 and/or the host device 422 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 402 and/or the host device 422 may be servers, desktops, laptops, or hand-held devices.

The remote device 402 and the host device 422 may be distant from each other and communicate over a network 450. In some embodiments, the host device 422 may be a central hub from which remote device 402 can establish a communication connection, such as in a client-server networking model. Alternatively, the host device 422 and remote device 402 may be configured in any other suitable networking relationship (e.g., in a peer-to-peer configuration or using any other network topology).

In some embodiments, the network 450 can be implemented using any number of any suitable communications media. For example, the network 450 may be a wide area network (WAN), a local area network (LAN), an internet, or an intranet. In certain embodiments, the remote device 402 and the host device 422 may be local to each other, and communicate via any appropriate local communication medium. For example, the remote device 402 and the host device 422 may communicate using a local area network (LAN), one or more hardwire connections, a wireless link or router, or an intranet. In some embodiments, the remote device 402 and the host device 422 may be communicatively coupled using a combination of one or more networks and/or one or more local connections. For example, the remote device 402 may be hardwired to the host device 422 (e.g., connected with an Ethernet cable) or the remote device 402 may communicate with the host device using the network 450 (e.g., over the Internet).

In some embodiments, the network 450 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 450.

In some embodiments, the remote device 402 may enable a user to input (or may input automatically with or without a user) a query to the host device 422 in order to identify subdivisions of a recording that include a particular subject. For example, the remote device 402 may include a query module 410 and a user interface (UI). The query module 410 may be in the form of a web browser or any other suitable software module, and the UI may be any type of interface (e.g., command line prompts, menu screens, graphical user interfaces). The UI may allow a user to interact with the remote device 402 to input, using the query module 410, a query to the host device 422, which may receive the query.

In some embodiments, the host device 422 may include a natural language processing system 432. The natural language processing system 432 may include a natural language processor 434, a search application 436, and a recording module 438. The natural language processor 434 may include numerous subcomponents, such as a tokenizer, a part-of-speech (POS) tagger, a semantic relationship identifier, and a syntactic relationship identifier. An example natural language processor is discussed in more detail in reference to FIG. 5.

The search application 436 may be implemented using a conventional or other search engine, and may be distributed across multiple computer systems. The search application 436 may be configured to search one or more databases (e.g., repositories), other computer systems, and/or other chatbots for content that is related to a query submitted by the remote device 402. For example, the search application 436 may be configured to search medical dictionaries, papers, archived medical reports, and/or other medical related chatbots to help identify a particular subject related to a query associated with a health class video. The recording analysis module 438 may be configured to analyze a recording to identify a particular subject (e.g., of the query), if the query includes such a recording. The recording analysis module 438 may include one or more modules or units, and may utilize the search application 436, to perform its functions (e.g., to identify a particular subject in a recording and/or query and/or recording associated with a query), as discussed in more detail in reference to FIG. 5.

In some embodiments, the host device 422 may include an image processing system 442. The image processing system 442 may be configured to analyze images associated with a query to create an image analysis. The image processing system 442 may utilize one or more models, modules, or units to perform its functions (e.g., to analyze the images associated with the recording and generate an image analysis). For example, the image processing system 442 may include one or more image processing models that are configured to identify specific images related to a recording used for/in a query. The image processing models may include a section analysis module 444 to analyze single images associated with the recording and to identify the location of one or more features of the single images. As another example, the image processing system 442 may include a subdivision module 446 to group multiple images together identified to have a common feature of the one or more features. In some embodiments, the image processing models may be implemented as software modules. For example, the image processing system 442 may include a section analysis module and a subdivision analysis module. In some embodiments, a single software module may be configured to analyze the image(s) using the image processing models.

In some embodiments, the image processing system 442 may include a threshold analysis module 448. The threshold analysis module 448 may be configured to compare, the instances of a particular subject identified in a subdivision of sections of the recording against a threshold number of instances. The threshold analysis module 448 may then determine if the subdivision should be transmitted to a user. In other embodiments, the threshold analysis module 448 may be used to help determine the numerical identifier for each chatbot.

In some embodiments, the host device may have an optical character recognition (OCR) module. The OCR module may be configured to receive a recording associated with a query, and which was sent from the remote device 402 and perform optical character recognition (or a related process) on the recording to convert it into machine-encoded text so that the natural language processing system 432 may perform NLP on the report. For example, the remote device 402 (e.g., which may be acting as a chatbot) may transmit an informational pamphlet of a Windsor knot being tied to the host device 422. The OCR module may convert the pamphlet into machine-encoded text, and then the converted pamphlet may be sent to the natural language processing system 432 for analysis. In some embodiments, the OCR module may be a subcomponent of the natural language processing system 432. In other embodiments, the OCR module may be a standalone module within the host device 422. In still other embodiments, the OCR module may be located on the remote device 402 and may perform OCR on the recording before the recording is sent to the host device 422.

While FIG. 4 illustrates a computing environment 400 with a single host device 422 and a remote device 402, suitable computing environments for implementing embodiments of this disclosure may include any number of remote devices and host devices. The various models, modules, systems, and components illustrated in FIG. 4 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS, to generate an image analysis.

It is noted that FIG. 4 is intended to depict the representative major components of an exemplary computing environment 400. In some embodiments, however, individual components may have greater or lesser complexity than as represented in FIG. 4, components other than or in addition to those shown in FIG. 4 may be present, and the number, type, and configuration of such components may vary.

Figure 5:
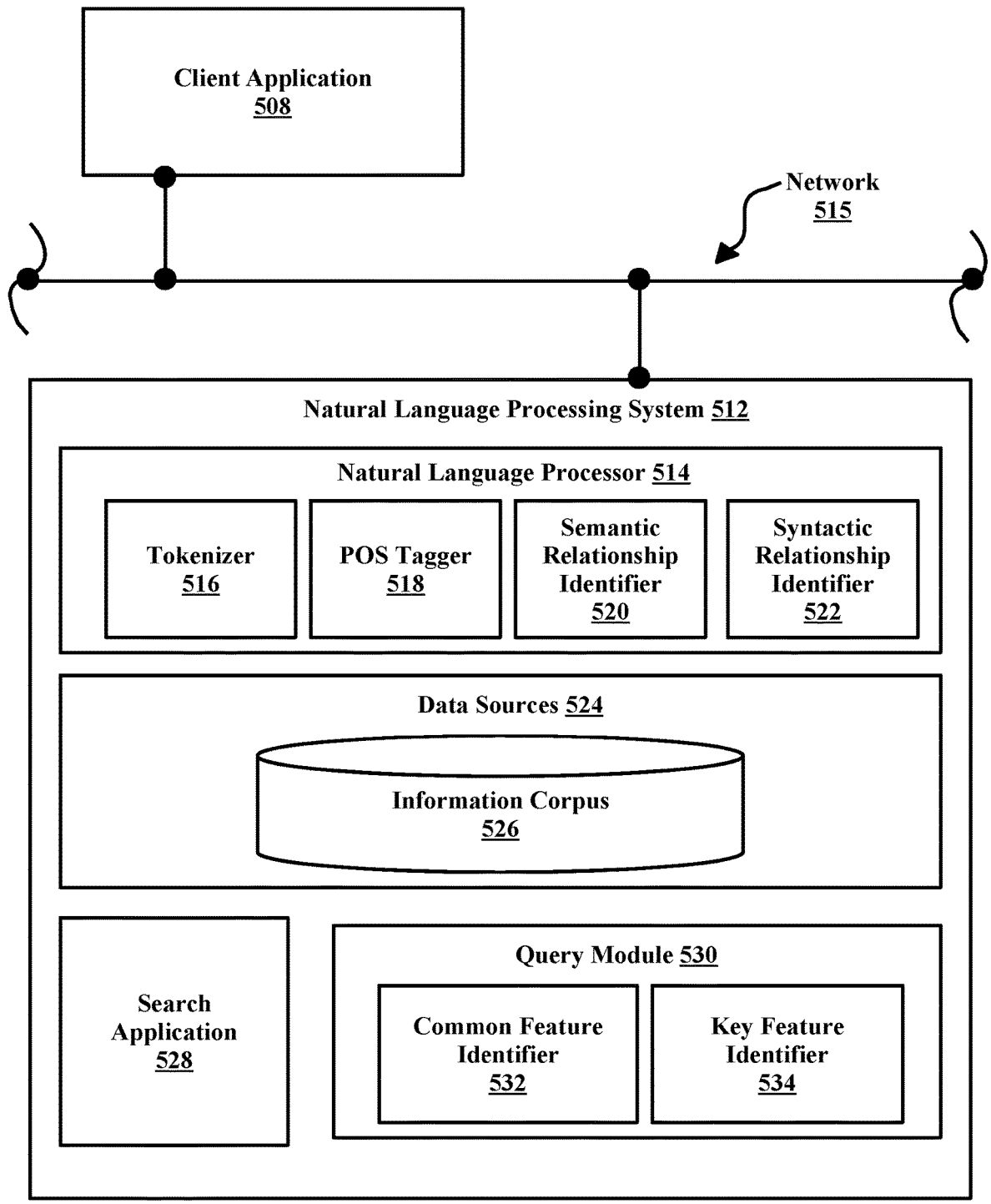
FIG. 5 illustrates a block diagram of an example natural language processing system configured to analyze a recording to identify a particular subject of a query, in accordance with embodiments of the present disclosure.

Referring now to FIG. 5, shown is a block diagram of an exemplary system architecture 500, including a natural language processing system 512, configured to analyze a query, and/or key features of the query, to identify a condition and a criterion, in accordance with embodiments of the present disclosure. In some embodiments, a remote device (such as remote device 402 of FIG. 4) may submit a query and/or a recording associated with the query to be analyzed to the natural language processing system 512 which may be housed on a host device (such as host device 422 of FIG. 4). Such a remote device may include a client application 508, which may itself involve one or more entities operable to generate or modify information associated with the recording and/or query that is then dispatched to a natural language processing system 512 via a network 515.

Consistent with various embodiments, the natural language processing system 512 may respond to query and recording submissions sent by a client application 508. Specifically, the natural language processing system 512 may analyze a received a recording and/or a query related to the recording to identify a key feature/particular subject in the query. In some embodiments, the natural language processing system 512 may include a natural language processor 514, data sources 524, a search application 528, and a query module 530. The natural language processor 514 may be a computer module that analyzes the recording and the query. The natural language processor 514 may perform various methods and techniques for analyzing recordings and/or queries (e.g., syntactic analysis, semantic analysis, etc.). The natural language processor 514 may be configured to recognize and analyze any number of natural languages. In some embodiments, the natural language processor 514 may group one or more sections of a recording into one or more subdivisions. Further, the natural language processor 514 may include various modules to perform analyses of recordings. These modules may include, but are not limited to, a tokenizer 516, a part-of-speech (POS) tagger 518 (e.g., which may tag each of the one or more sections in which the particular subject is identified), a semantic relationship identifier 520, and a syntactic relationship identifier 522.

In some embodiments, the tokenizer 516 may be a computer module that performs lexical analysis. The tokenizer 516 may convert a sequence of characters (e.g., images, sounds, etc.) into a sequence of tokens. A token may be a string of characters included in a recording and categorized as a meaningful symbol. Further, in some embodiments, the tokenizer 516 may identify word boundaries in a recording and break any text within the recording (e.g., from closed-caption, etc.) into their component text elements, such as words, multiword tokens, numbers, and punctuation marks. In some embodiments, the tokenizer 516 may receive a string of characters, identify the lexemes in the string, and categorize them into tokens.

Consistent with various embodiments, the POS tagger 518 may be a computer module that marks up a word in a query/recording to correspond to a particular part of speech. The POS tagger 518 may read a passage or other text in natural language and assign a part of speech to each word or other token. The POS tagger 518 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed queries, documents, texts, recordings, etc. (e.g., the content of one recording may shed light on the meaning of one or more subjects in another recording). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a recording with part of speech categories. In some embodiments, the POS tagger 518 may tag tokens or words of a query and/or recording to be parsed by the natural language processing system 512.

In some embodiments, the semantic relationship identifier 520 may be a computer module that may be configured to identify semantic relationships of recognized subjects (e.g., words, phrases, images, etc.) in a query and/or recording. In some embodiments, the semantic relationship identifier 520 may determine functional dependencies between entities and other semantic relationships.

Consistent with various embodiments, the syntactic relationship identifier 522 may be a computer module that may be configured to identify syntactic relationships in a recording composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that may group sections of a query and/or recording into subdivisions and generate corresponding data structures for one or more subdivisions of the query and/or recording. For example, in response to receiving a query at the natural language processing system 512, the natural language processor 514 may output subdivisions of the query as data structures. In some embodiments, a subdivision may be represented in the form of a graph structure. To generate the subdivision, the natural language processor 514 may trigger computer modules 516-522.

In some embodiments, the output of natural language processor 514 may be used by search application 528 to perform a search of a set of (e.g., one or more) corpora to retrieve one or more subdivision including a particular subject associated with a query and send the output to an image processing system and to a comparator. As used herein, a corpus may refer to one or more data sources, such as the data sources 524 of FIG. 5. In some embodiments, the data sources 524 may include video libraries, data warehouses, information corpora, data models, and document repositories. In some embodiments, the data sources 524 may include an information corpus 526. The information corpus 526 may enable data storage and retrieval. In some embodiments, the information corpus 526 may be a subject repository that houses a standardized, consistent, clean, and integrated list of images and dialogue. For example, the information corpus 526 may include the famous movie quotes. The data may be sourced from various operational systems. Data stored in the information corpus 526 may be structured in a way to specifically address reporting and analytic requirements. In some embodiments, the information corpus 526 may be a relational database.

In some embodiments, the query module 530 may be a computer module that identifies common features within sections of a query and/or recording, and a key feature/particular subject of a query in subdivisions of sections of the recording. In some embodiments, the query module 530 may include a common feature identifier 532 and a key feature identifier 534. When a query is received by the natural language processing system 512, the query module 530 may be configured to analyze the query using natural language processing to identify a key feature/particular subject. The query module 530 may first identity one or more features/subjects in the query using the natural language processor 514 and related subcomponents 516-522. After identifying the one or more subjects, the common feature identifier 532 may identify one or more common features present in sections of the query. In some embodiments, the common features in the sections may be the same subject that is identified. Once a common feature is identified, the common feature identifier 532 may be configured to transmit the sections that include the common feature to an image processing system (shown in FIG. 4) and/or to a comparator (e.g., the threshold analysis module 448 of FIG. 4).

After identifying common features of a query using the common feature identifier 532, the query module 530 may group sections of the query having common features into subdivisions. The key feature identifier 534 may the identify a key feature/particular subject in subdivisions of the query and/or the recording, based upon the query. In some embodiments, the particular subject may one or more of the common features identified in the one or more sections of the query and/or recording. After identifying a particular subject relating to the query, the key feature identifier 534 may be configured to transmit the criterion to an image processing system (shown in FIG. 4) and/or to a comparator.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
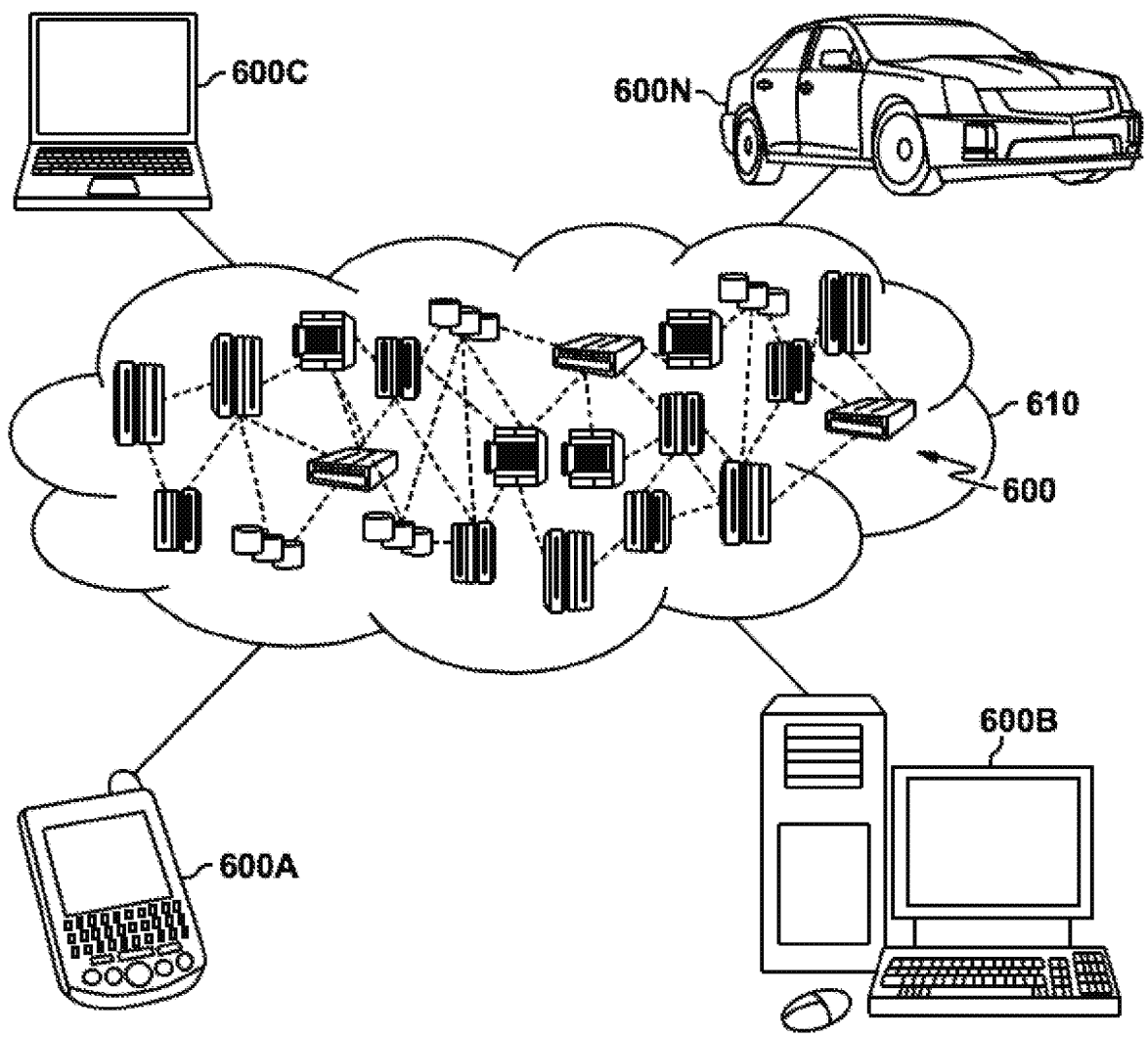
FIG. 6 depicts a cloud computing environment, in accordance with embodiments of the present disclosure.

Referring now to FIG. 6, illustrative cloud computing environment 610 is depicted. As shown, cloud computing environment 610 includes one or more cloud computing nodes 600 with which local computing devices used by cloud consumers, such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as Private, Community, Public, or Hybrid clouds as described hereinabove, or a combination thereof.

This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
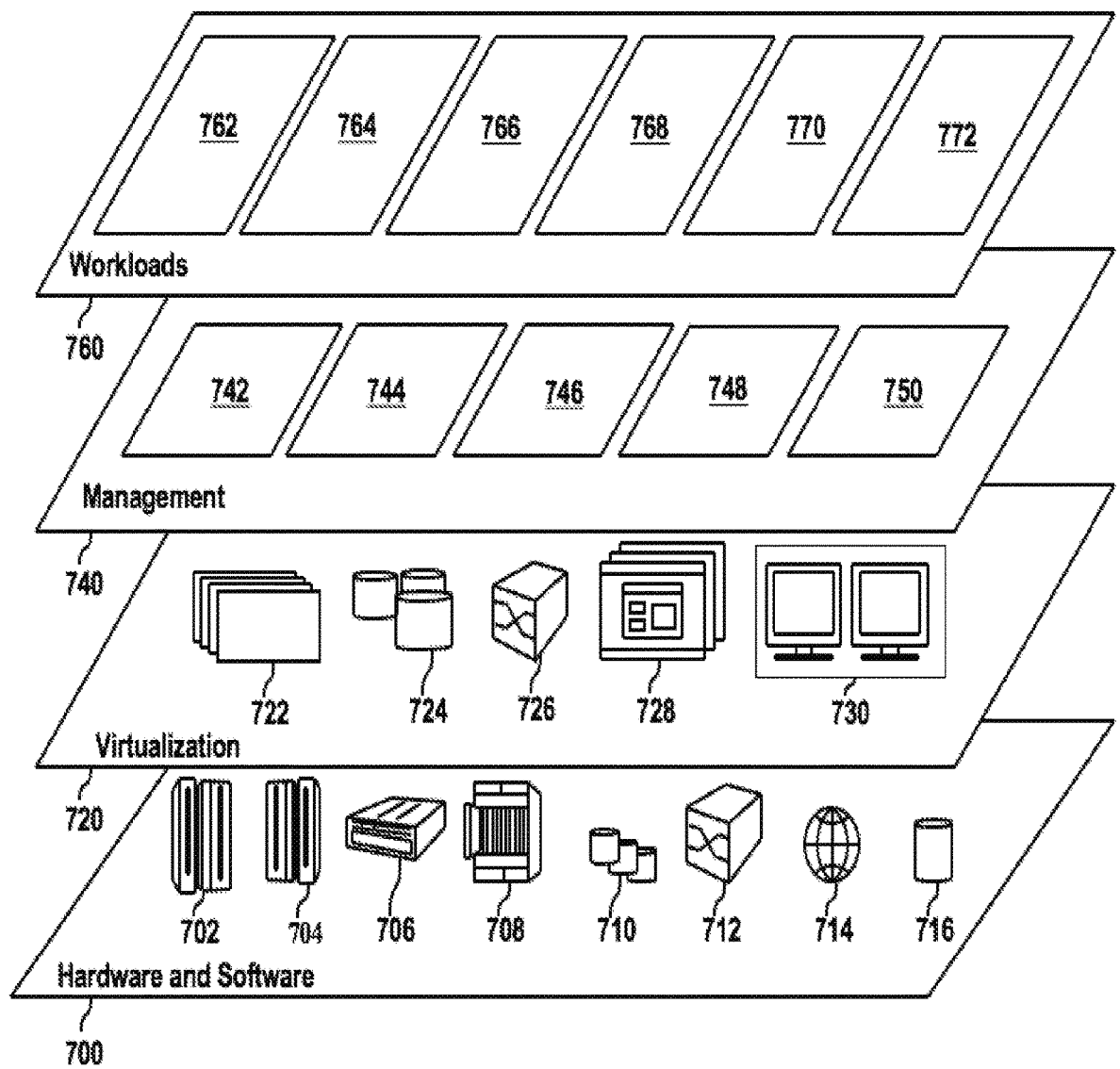
FIG. 7 depicts abstraction model layers, in accordance with embodiments of the present disclosure.

Referring now to FIG. 7, a set of functional abstraction layers provided by cloud computing environment 610 (FIG. 6) is shown. It should be understood in advance that the components, layers, and functions shown in FIG. 7 are intended to be illustrative only and embodiments of the invention are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and mobile desktop 772.

Figure 8:
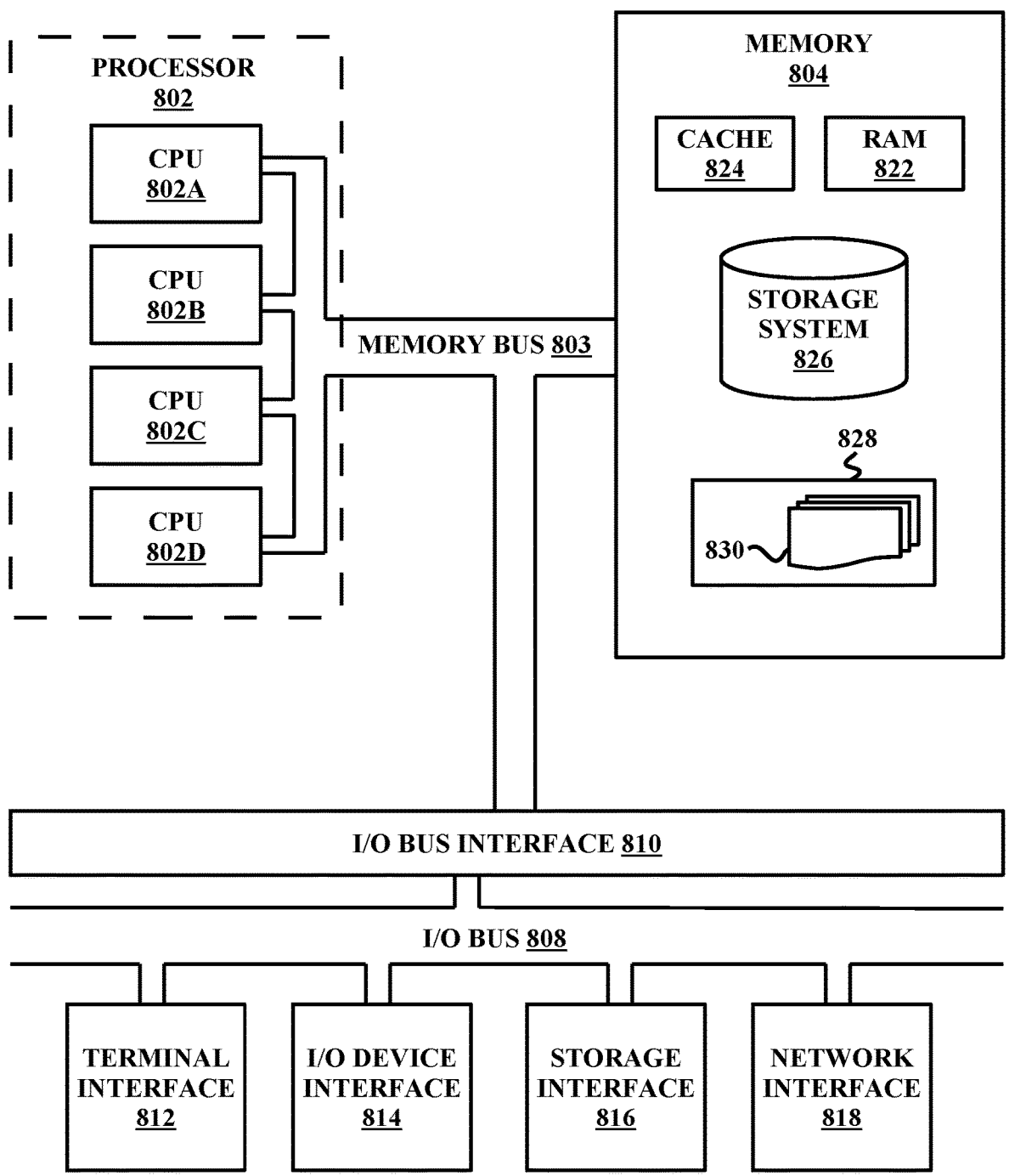
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
receiving, by a primary chatbot, a query from a user;
analyzing, using natural language processing techniques, the query;
identifying, from the analyzing, one or more key features of the query, wherein the one or more key features are individual semantic parts of speech from the query;
pushing, by the primary chatbot, the one or more key features to one or more secondary chatbots;
identifying which one of the primary chatbot and the one or more secondary chatbots is to respond to the query, wherein identifying which one of the primary chatbot and the one or more secondary chatbots is to respond to the query comprises:
voting by each of the primary chatbot and the one or more secondary chatbots, wherein the voting indicates each of the primary chatbot's and the one or more secondary chatbots' confidences in the other chatbots responding to the query; and
transmitting a response to the query to the user.

2. The method of claim 1, further comprising:
pushing, in response to identifying that a first secondary chatbot is to respond to the query, the query to the first secondary chatbot; and
receiving the response from the first secondary chatbot.

3. The method of claim 2, further comprising:
generating, automatically, a second query, wherein the second query includes a prompt for user feedback;
receiving the user feedback; and
updating, in response to receiving the user feedback, a respondent classifier, wherein the respondent classifier indicates to the primary chatbot that the first secondary chatbot is predicted to respond to succeeding queries.

4. The method of claim 1, wherein identifying which one of the primary chatbot and the one or more secondary chatbots is to respond to the query further comprises:
ranking, based on the polled confidence, the primary chatbot and the one or more secondary chatbots; and
selecting a chatbot with the highest confidence of the primary chatbot and the one or more secondary chatbots.

5. The method of claim 1, wherein voting by each of the primary chatbot and the one or more secondary chatbots to find the primary chatbot's and the one or more secondary chatbots' confidences in the other chatbots responding to the query comprises:
comparing, by the primary chatbot and the one or more secondary chatbots, the one or more key features to metadata associated with each of the primary chatbot and the one or more secondary chatbots;
identifying how much of the metadata matches the one or more key features; and
allocating a numerical tag to each of the primary chatbot and the one or more secondary chatbots, wherein the numerical tags indicate the amount of metadata that matched the one or more key features.

6. The method of claim 1, wherein pushing the one or more key features to the one or more secondary chatbots is in response to determining that the primary chatbot is incapable of answering the query.

7. The method of claim 6, further comprising:
replacing the primary chatbot with one of the one or more secondary chatbots; and
transferring the user to the one of the one or more secondary chatbots for the response to the query.

8. A system comprising:
a memory; and
a processor in communication with the memory, the processor being configured to perform operations comprising:
receiving, by a primary chatbot, a query from a user;
analyzing, using natural language processing techniques, the query;
identifying, from the analyzing, one or more key features of the query, wherein the one or more key features are individual semantic parts of speech from the query;
pushing, by the primary chatbot, the one or more key features to one or more secondary chatbots;
identifying which one of the primary chatbot and the one or more secondary chatbots is to respond to the query, wherein identifying which one of the primary chatbot and the one or more secondary chatbots is to respond to the query comprises:
voting by each of the primary chatbot and the one or more secondary chatbots, wherein the voting indicates each of the primary chatbot's and the one or more secondary chatbots' confidences in the other chatbots responding to the query; and
transmitting a response to the query to the user.

9. The system of claim 8, wherein the operations further comprise:
pushing, in response to identifying that a first secondary chatbot is to respond to the query, the query to the first secondary chatbot; and
receiving the response from the first secondary chatbot.

10. The system of claim 9, wherein the operations further comprise:
 generating, automatically, a second query, wherein the second query includes a prompt for user feedback;
 receiving the user feedback; and
 updating, in response to receiving the user feedback, a respondent classifier, wherein the respondent classifier indicates to the primary chatbot that the first secondary chatbot is predicted to respond to succeeding queries.

11. The system of claim 8, wherein identifying which one of the primary chatbot and the one or more secondary chatbots is to respond to the query further comprises:
 ranking, based on the polled confidence, the primary chatbot and the one or more secondary chatbots; and
 selecting a chatbot with the highest confidence of the primary chatbot and the one or more secondary chatbots.

12. The system of claim 8, wherein voting by each of the primary chatbot and the one or more secondary chatbots to find the primary chatbot's and the one or more secondary chatbots' confidences in the other chatbots responding to the query comprises:
 comparing, by the primary chatbot and the one or more secondary chatbots, the one or more key features to metadata associated with each of the primary chatbot and the one or more secondary chatbots;
 identifying how much of the metadata matches the one or more key features; and
 allocating a numerical tag to each of the primary chatbot and the one or more secondary chatbots, wherein the numerical tags indicate the amount of metadata that matched the one or more key features.

13. The system of claim 8, wherein pushing the one or more key features to the one or more secondary chatbots is in response to determining that the primary chatbot is incapable of answering the query.

14. The system of claim 13, wherein the operations further comprise:
 replacing the primary chatbot with one of the one or more secondary chatbots; and
 transferring the user to the one of the one or more secondary chatbots for the response to the query.

15. A computer program product comprising a non-transitory computer readable storage medium having program instructions embodied therewith, the program instructions executable by a processor to cause the processor to perform a method, the method comprising:
 receiving, by a primary chatbot, a query from a user;
 analyzing, using natural language processing techniques, the query, wherein the one or more key features are individual semantic parts of speech from the query;
 identifying, from the analyzing, one or more key features of the query;
 pushing, by the primary chatbot, the one or more key features to one or more secondary chatbots;
 identifying which one of the primary chatbot and the one or more secondary chatbots is to respond to the query, wherein identifying which one of the primary chatbot and the one or more secondary chatbots is to respond to the query comprises:
 voting by each of the primary chatbot and the one or more secondary chatbots, wherein the voting indicates each of the primary chatbot's and the one or more secondary chatbots' confidences in the other chatbots responding to the query; and
 transmitting a response to the query to the user.

16. The computer program product of claim 15, further comprising:
 pushing, in response to identifying that a first secondary chatbot is to respond to the query, the query to the first secondary chatbot; and
 receiving the response from the first secondary chatbot.

17. The computer program product of claim 16, further comprising:
 generating, automatically, a second query, wherein the second query includes a prompt for user feedback;
 receiving the user feedback; and
 updating, in response to receiving the user feedback, a respondent classifier, wherein the respondent classifier indicates to the primary chatbot that the first secondary chatbot is predicted to respond to succeeding queries.

18. The computer program product of claim 15, wherein identifying which one of the primary chatbot and the one or more secondary chatbots is to respond to the query further comprises:
 ranking, based on the polled confidence, the primary chatbot and the one or more secondary chatbots; and
 selecting a chatbot with the highest confidence of the primary chatbot and the one or more secondary chatbots.

19. The computer program product of claim 15, wherein voting by each of the primary chatbot and the one or more secondary chatbots to find the primary chatbot's and the one or more secondary chatbots' confidences in the other chatbots responding to the query comprises:
 comparing, by the primary chatbot and the one or more secondary chatbots, the one or more key features to metadata associated with each of the primary chatbot and the one or more secondary chatbots;
 identifying how much of the metadata matches the one or more key features; and
 allocating a numerical tag to each of the primary chatbot and the one or more secondary chatbots, wherein the numerical tags indicate the amount of metadata that matched the one or more key features.

20. The computer program product of claim 15, wherein pushing the one or more key features to the one or more secondary chatbots is in response to determining that the primary chatbot is incapable of answering the query, and wherein the method further comprises:
 replacing the primary chatbot with one of the one or more secondary chatbots; and
 transferring the user to the one of the one or more secondary chatbots for the response to the query.

\* \* \* \* \*